United States Patent Office 3,124,147
Patented Mar. 10, 1964

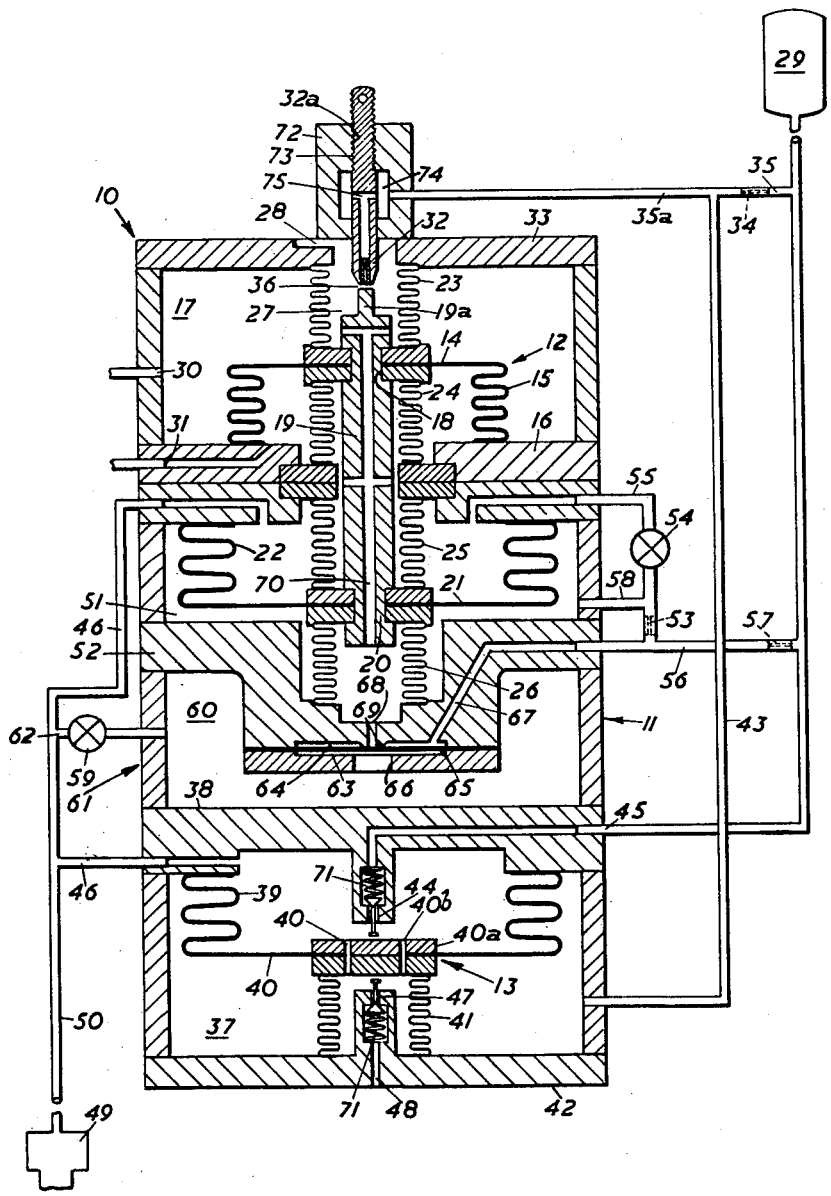

3,124,147
PNEUMATIC FORCE-BALANCE CONTROLLERS
Henry Albert Hallett, Cheltenham, England, assignor to Cheltenham Auto Controls Limited, Cheltenham, England
Filed Sept. 8, 1960, Ser. No. 54,644
7 Claims. (Cl. 137—86)

This invention relates to pneumatic force-balance controllers as used in conjunction with pneumatic regulators in automatic control systems. In such systems a signal in the form of an air pressure (or the pressure of another gaseous fluid) which is a measure of a physical quantity, for example a temperature, pressure, flow rate, liquid level or other process variable, is fed to the controller and therein compared with a desired value, which is also an air or other gaseous fluid pressure, any deviation between the two causing the gas pressure fed to the regulator to be varied and cause the latter to regulate the process or the like so that the signal pressure is increased or reduced to the desired value. Usually in such systems the gas pressure constituting the signal is fed to the controller from a pneumatic signal transmitter.

In the operation of force-balance controllers of the foregoing character they are fed with pressure gas, usually air, from a compressed air supply and exhaust through a nozzle, the amount of air exhausted being minute. The pneumatic controllers hitherto known are made to exhaust into an atmosphere having an absolute pressure equal to that in the regulator, it being considered that nozzle pressure is thereby always maintained at a constant potential above the zone into which it exhausts. In fact, however, the potential value falls as controller output pressure increases towards supply pressure and the difficulty is overcome by using a supply pressure higher than any desired output pressure. This expedient, however, merely reduces the error the effect of which is to reduce the sensitivity of the controller as output pressure rises.

The main object of the present invention is to provide an improved pneumatic force-balance controller with which this defect and certain other disadvantages of the hitherto known controllers are avoided.

According to the invention the improved pneumatic force-balance controller comprises a sensing device having a plate to opposite sides of which in use a gas pressure of the desired value and the signal pressure are respectively applied in direct opposition, such opposite sides of the plate being sealed from each other by a bellows so that deviation between said two pressures causes movement of said plate to vary the gap at the tip of a nozzle which is fed with compressed gas and exhausts to atmosphere, such gap variation causing a variable nozzle pressure, and relay or reaction valve means responsive to said variable nozzle pressure to control feed of gas pressure to a pneumatic regulator.

The plate is conveniently rigid so that flexing thereof is negligible in use, and it may carry a centrally arranged pillar one end of which cooperates with the nozzle to effect said variation of the gap, the pillar being supported towards its opposite end by a second bellows placed end to end to said bellows to be concentric therewith but separated by a wall therefrom.

Due to the invention a pneumatic force-balance controller results which is uniformly sensitive throughout its output pressure range and with which the exhaust nozzle is freely accessible for attention or replacement. Moreover the controller has better stability than the devices hitherto known, the bellows arrangement having greater elasticity than diaphragms and exhibiting less tendency to flutter than capsules.

One constructional form of pneumatic force-balance controller according to the invention will now be described, by way of example, with reference to the accompanying drawing, the single figure of which illustrates the controller diagrammatically in axial section together with a portion of the pressure gas supply circuit.

Referring to the drawing, the controller 10 shown therein is of the "Stack" type and comprises a hollow body 11 housing at one end a sensing device 12 and at its opposite end relay or reaction valve means in the form of a unit 13. The sensing device 12 consists broadly of a rigid plate 14 which closes the free end of a bellows 15 the opposite end of which is mounted on a transverse wall 16 which separates the upper end of the body 11 from the remainder to form a chamber 17. In a centrally formed aperture 18 in the plate 14 a pillar 19 is mounted, the opposite end of the pillar being carried in an aperture 20 centrally formed in a plate 21 which closes the free end of a second bellows 22 the other end of which is mounted on the transverse wall 16 so that the bellows 15, 22 are arranged end to end and concentrically of each other. A series of concentrically arranged bellows 23, 24, 25, 26 are provided to form a channel 27 having an opening 28 at one end to atmosphere and in which the pillar 19 is mounted so as to be movable axially therein.

Gas pressure of the desired value from an air supplying source 29 is fed through a suitable restrictor and channel 30 to the interior of the chamber 17 so that one side of the plate 14 and bellows 15 is subjected to such pressure. To the interior of the bellows 15 signal pressure, for example from a pneumatic force-balance signal transmitter, is fed through a channel 31 in the transverse wall 16 so that the other side of the plate 14 is subjected to the signal pressure. The sensing device 12 also comprises a nozzle 32 supported from an end wall 33 of the body 11, the nozzle being fed with air at an arbitary pressure, for example 17 lbs./sq. in., through a suitable restrictor 34 in a feed line 35, 35a from the air supply source 29. A reduced end 19a of the pillar 19 cooperates with the nozzle 32 to form the aforesaid air gap 36 therebetween. It will be appreciated that if signal pressure in the interior of the signal pressure bellows 15 is less than the desired value in the chamber 17 the pillar 29 moves to compress the signal pressure bellows and, due to the position of the nozzle 32, consequential movement of the plate 14 and pillar 19 increases the gap 36 at the tip of the nozzle.

It will be seen that the restrictor 34 in the feed line 35, 35a to the nozzle 32 involves a pressure drop in the air feed to the nozzle when the air flow rate increases. Accordingly, when the gap 36 at the nozzle tip of the nozzle 32 is widened, there is less resistance to air flow from the nozzle and there is consequently a pressure drop across the restrictor 34 so that the pressure in the portion 35a of the feed line between the restrictor and the nozzle is reduced. Similarly, if the nozzle gap 36 is reduced, the pressure in the feed line 35a between the restrictor 34 and the nozzle 32 increases, and it is this variable pressure in this portion of the feed line which is termed herein "nozzle pressure."

The relay valve unit 13 comprises a chamber 37 separated from the remainder of the body 11 by a lower transverse wall 38. In the embodiment illustrated the relay valve unit also comprises a bellows 39 mounted within the chamber 37 and one end of which is secured to the transverse wall 38 whilst its opposite end is secured to one side of a plate 40 the opposite side of which carries what may be termed an extension bellows 41 concentric with the bellows 39 and extending between the opposite side of the plate and an end wall 42 of the body 11. The interiors of the bellows 39 and 41 are connected by apertures 40b formed in a thickened portion 40a of the plate 40 so that such interiors both experience equal pressure. Nozzle pressure is fed through a channel 43 to the chamber 37 and therefore to the outside of the larger bellows 39. If the pressure in the chamber 37 increases the plate 40 moves inwardly to press upon an inlet valve 44 arranged at the inner end of a channel 45 in the wall 38 connected to the air supply source 29. Such pressure causes the valve 44 to open and admit compressed air into the interiors of the two bellows 39, 41 and thence into a line 46 running from the relay valve unit 13 to the interior of the bellows 22 which serve as proportioning bellows. When the pressures in the chamber 37 and the bellows 39 are balanced the inlet valve 44 will close.

On the other hand if the pressure in the chamber 37 decreases the plate 40 moves outwardly towards an exhaust valve 47 mounted in the end wall 42 to open it and release air through a channel 48 to atmosphere from the interiors of the bellows 39, 41 and from a pneumatic unit 49 connected thereto, until the two pressures in the bellows 39, 41 and the chamber 37 are again in balance.

The controller operates in the following manner:

Assuming that an increase in signal pressure is required to cause extra pressure to be fed into the pneumatic regulating unit 49, the increased signal pressure causes the gap 36 at the nozzle 32 of the sensing device 12 to decrease whereby the pressure fed to the chamber 37 of the relay valve unit 13 is increased. This opens the inlet valve 42 to admit air to the interiors of the bellows 39, 41 of the relay valve unit 13 until the pressures on both sides of the bellows are in balance. Pressure air is also fed from the interior of the bellows 39 of the relay valve unit to the line 46 connecting the latter to the proportioning bellows 22. This line 46 is provided with a tapping 50 to the pneumatic regulating unit 49, the pressure in the tapping being the output pressure of the controller. Simultaneous with the above the pressure in the relay valve unit 13 is fed back through the line 46 to the interior of the proportioning bellows 22 of the sensing device 12 where it acts on the plate 21 in opposition to the initiating increase in signal pressure and increases the gap 36 at the nozzle 32 of the sensing device. The gap 36, however, cannot be returned to its original dimensions as this would imply that the pressure in the proportioning bellows 22 had not changed.

So that the controller reaction to a given change in signal can be varied, a variable proportion of the pressure from the relay valve unit 13 is also fed to a chamber 51 enclosing the proportioning bellows 22 and formed between the transverse wall 16 and a central transverse wall 52. Such variable proportion of the pressure is applied to the external surface of the plate 21 and to the outside of the proportioning bellows 22 to act in the same direction as the initiating change in signal pressure. This variable proportion is obtained by means of a variable needle valve 54 arranged in a line 55 connecting the interior of the proportioning bellows 22 to a line 58 connected to the chamber 51. In order to maintain a flow of air through the valve 54 and thus a pressure drop across the latter some of the air must be dissipated and this is effected by providing a bleed passage having a restrictor 53 between the lines 58 and a line 56, fed at one end with pressure air from the supply source 29 through a restrictor 57 and intermittently connected to atmosphere at its other end in a manner hereinafter to be described. The restrictor 53 limits the flow of air through the passage connecting lines 58 and 56 and renders it possible to maintain a greater pressure in the line 58 than the line 56 by opening the valve 54. The pressure in the chamber 51 is thus proportional to the output pressure of the relay valve unit 13 and the proportion can be varied by adjusting the setting of the needle valve 54. Adjustment of the nozzle gap 36 continues until the difference between the two forces acting on opposite sides of the plate 21 of the proportioning bellows 22 is equal to the difference between the two forces acting on the plate 14, such forces being set up by the desired value value and signal pressures.

This arrangement gives a practically instantaneous change of output pressure for a given change of signal pressure. However, it is often desirable to vary the output pressure according to the length of time the signal pressure differs from that of the desired value. This is accomplished by feeding the output pressure from the relay valve unit 13 through a line 62 provided with a needle valve 59 into a chamber 60 of comparatively large capacity in an integral unit 61 positioned between the sensing device 12 and the relay valve unit. The pressure in the chamber 60 thus gradually increases, or decreases, until it is equal to the output pressure of the relay valve unit 13. The purpose of the integral unit 61 is to stimulate proportional action to continue in the direction initiated by a signal deviation until such deviation has been eliminated. The tendency for integral action to cause proportional action to overshoot is regulated by adjustment of the valve 59.

The integral unit 61 also comprises two adjoining chambers 63, 64 formed in the lower end of the transverse wall 52, such chambers being separated from each other by a flexible diaphragm 65. A central opening 66 connects the chambers 63 and 60 so that the pressure in the latter is applied to one side of the diaphragm 65. The chamber 64 is supplied with compressed air through the restrictor 57 and line 56 by means of a channel 67. An exhaust port 68 having a raised surrounding seating 69 is formed in the side wall of the chamber 64, such port communicating with atmosphere through an axial channel 70 in the pillar 19. If the pressure in the chambers 60 and 63 is greater than the pressure in the chamber 64 on the other side of the diaphragm 65 the latter will move upwardly to close the exhaust port 68 and allow the pressure to build up until the pressures on both sides of the diaphragm are equal. If the pressure in the chamber 60, and hence the pressure in the line 56, is gradually increasing then the proportional feed to the chamber 51 will gradually increase as the increasing resistance to the flow of air from the line 58 through the restrictor 53 to the line 56 decreases the quantity of air being bled from the line 58. In consequence the gap 36 at the nozzle will decrease and the output pressure of the relay valve unit 13 will increase.

Thus the controller output pressure will continue to increase until the signal pressure returns to the same pressure as the desired value. A state will then exist where due to the equal pressures on either side of the plate 14 of the sensing device 12 equilibrium results and the nozzle gap 36 remains unchanged.

It will be understood that the connections 30, 31 by which desired value and signal pressure are fed to opposite sides of the plate 14 may be reversed when operation of the controller is desired such that increase in signal pressure is required to cause decrease in pressure to be fed to the pneumatic regulating unit 49.

To enable adjustment of the air gap 36 to be easily effected and also to enable the nozzle 32 to be readily cleaned or replaced, the latter is mounted in a block 72 secured to the end wall 33, the outer end 32a of the nozzle being solid and having a screw thread which cooperates with a tapped bore 73 in the block. Pressure air is fed from the line 35a to a chamber 74 in the block and thence through a transverse bore 75 in the nozzle 32 to the tip of the latter.

The inlet and exhaust valves of the relay valve unit 13 are coaxially arranged one on each side of the centre portion 40a of the plate 40 carried by the bellows 39 of such unit. They may comprise standard spring-loaded valve cores and bodies of the type commonly used for motor vehicle tyres, each valve being mounted in a tapped bore 71 formed in the transverse wall 38 and end wall 42 respectively. This arrangement allows the valves 42, 47 to be independently adjusted with respect to the plate 40 so that they are rendered critically sensitive to changes in pressures in the chamber 37 and interior of the bellows 39.

It will be appreciated that the application of pressures to opposite sides of one and the same bellows automatically ensures that the areas of the operative portions of the bellows exposed to such pressures are equal, whereas if separate diaphragms or capsules are employed, careful matching of the areas subjected to the various pressures is necessary.

It will be noted that in the arrangement illustrated the lines connecting the sensing device, relay valve unit, integral unit and other components are not formed in the body 11 but are provided by external lines or channels. This enables the controller to be employed if desired with a separate block unit carrying the necessary connecting lines or channels arranged to give the desired circuit. Owing to this feature, by substitution of a different block, the circuit can be re-arranged if desired to suit a given application. Moreover, this feature also allows the controller to be adapted to be "plugged in" to an existing recorder, indicator or other unit.

I claim:

1. A pneumatic force-balance controller comprising a sensing device having a rigid plate to opposite sides of which in use a gas pressure of the desired value, obtained from a source of substantially constant gas pressure, and a signal pressure are respectively applied in direct opposition, a nozzle exhausting to atmosphere, means to feed gas under pressure to said nozzle, a first bellows at one end of which said plate is mounted so that said opposite sides of the plate are sealed from each other, a first chamber surrounding said first bellows and having a separating wall which closes the opposite end of said first bellows, a second bellows placed end to end with said first bellows to be concentric therewith but separated therefrom by said wall, a second chamber surrounding said second bellows, a pillar concentric with said first and second bellows, which passes therethrough and through said wall and is carried by said plate and a movable end of said second bellows, one end of said pillar cooperating with said nozzle so that deviation between said two pressures causes movement of said plate and pillar to vary a gap at the tip of said nozzle and produce a variable nozzle pressure upstream of said nozzle, relay valve means responsive to said variable nozzle pressure to control feed of gas pressure to a pneumatic regulator, said relay valve means being in the form of a unit comprising a third chamber having a wall, a third bellows contained within the third chamber secured at one end of the third wall, a second plate which closes the opposite end of the third bellows and movement of which operates valve means capable of admitting compressed gas to the interior of the third bellows or allowing gas to escape therefrom, said valve means comprising an inlet valve opening into the interior of said third bellows, an exhaust valve arranged externally of the third bellows, a further wall of said third chamber opposite to said third wall, a fourth bellows communicating with said third bellows and arranged between said second plate and said opposite wall of the third chamber, gas at nozzle pressure being fed to the third chamber, and gas at constant pressure being fed to the inlet valve whereby collapse of said third bellows under nozzle pressure causes the second plate to effect opening of the inlet valve to admit compressed gas to the interior of said third bellows to return the second plate to its original position, expansion of said third bellows causing the exhaust valve to open and the compressed gas to escape from the interior of the third bellows until equal pressure exists on both sides of the second plate, and means for feeding back gas pressure from said relay valve means to said second bellows and second chamber to counterbalance the forces exerted by said plate, said feedback means including a first variable restrictor to proportion the pressure required of the relay valve means to produce the correct counterbalance force.

2. A controller according to claim 1, wherein gas pressure from the interior of the third bellows is fed to the pneumatic regulator and to the interior of said second bellows, which forms a proportioning bellows and is contained within said second chamber, one side of which is formed by said separating wall, a proportion of the pressure from the relay valve unit being fed to the second chamber to act in opposition to the pressure fed to the interior of the second bellows.

3. A controller according to claim 2, wherein a variable restriction is interposed between the output of the relay valve means and said second chamber.

4. A controller according to claim 3, wherein an integral unit is provided to vary the output pressure according to the length of time the signal pressure differs from that of the desired value, the integral unit comprising a comparatively large fourth chamber, a movable element on one side of which said fourth chamber is arranged to which the output pressure is fed through a second variable restrictor, the opposite side of said movable element being subjected to said source of substantially constant gas pressure and controlling an exhaust to atmosphere, the arrangement being such that when the pressure in said fourth chamber is greater than that of the source of substantially constant pressure the movable element moves to close the exhaust and thereby allow the pressure on said opposite side to build up until the pressures on both sides of the movable element are equal, said build-up of pressure increasing the proportional feed to the second chamber and thus decreasing the gap at the nozzle and increasing the output pressure.

5. A controller according to claim 2, comprising a series of concentrically arranged bellows which form a channel passing axially through the first and second bellows and the first and second chambers, the pillar being arranged within said channel one end of which opens to atmosphere.

6. A controller according to claim 1, wherein said first, second and third bellows are arranged in axial alignment within a body of the controller.

7. A controller according to claim 1, wherein said inlet and exhaust valves comprise spring-loaded cores and bodies, each valve being mounted in a tapped bore to allow the valves to be independently adjusted.

References Cited in the file of this patent

UNITED STATES PATENTS

| | | |
|---|---|---|
| 2,312,201 | Thompson et al. | Feb. 23, 1943 |
| 2,517,051 | Swenson | Aug. 1, 1950 |
| 2,518,244 | Moore | Aug. 8, 1950 |
| 2,767,725 | Long | Oct. 23, 1956 |
| 2,915,079 | Harrison | Dec. 1, 1959 |